United States Patent [19]
Carriere

[11] Patent Number: 5,862,883
[45] Date of Patent: *Jan. 26, 1999

[54] TREE STAND

[75] Inventor: Steven Normand Carriere, Little Smokey, Canada

[73] Assignee: Jennifer Carriere, Valleyview, Canada

[ * ] Notice: The term of this patent shall not extend beyond the expiration date of Pat. No. 5,588,499.

[21] Appl. No.: 763,944

[22] Filed: Dec. 12, 1996

Related U.S. Application Data

[63] Continuation of Ser. No. 401,501, Mar. 10, 1995, Pat. No. 5,588,499.

[51] Int. Cl.$^6$ ..................................................... E04G 3/00
[52] U.S. Cl. ........................................... 182/135; 182/187
[58] Field of Search ..................................... 182/187, 188, 182/135, 134, 116

[56] References Cited

U.S. PATENT DOCUMENTS

| | | | |
|---|---|---|---|
| 1,223,568 | 4/1917 | De Point et al. | 187/187 |
| 2,168,111 | 8/1939 | Barnes | 182/187 |
| 3,493,080 | 2/1970 | Ehlert et al. | 182/187 |
| 3,743,050 | 7/1973 | Danz | 182/9 |
| 3,960,240 | 6/1976 | Cotton . | |
| 4,316,526 | 2/1982 | Amacker . | |
| 4,321,983 | 3/1982 | Nelson . | |
| 4,331,216 | 5/1982 | Amacker . | |
| 4,410,066 | 10/1983 | Swett . | |
| 4,417,645 | 11/1983 | Untz . | |
| 4,452,338 | 6/1984 | Untz . | |
| 4,488,620 | 12/1984 | Gibson . | |
| 4,726,447 | 2/1988 | Gibson et al. . | |
| 4,953,662 | 9/1990 | Porter | 182/187 |
| 4,969,538 | 11/1990 | Amacker . | |
| 5,097,925 | 3/1992 | Walker, Jr. | 182/187 |
| 5,098,925 | 3/1992 | Walker | 182/187 |
| 5,234,076 | 8/1993 | Louk et al. | 182/187 |

FOREIGN PATENT DOCUMENTS

| | | | |
|---|---|---|---|
| 2646611 | 11/1990 | France | 182/135 |
| 159620 | 12/1963 | U.S.S.R. | 182/134 |

*Primary Examiner*—Alvin Chin-Shue
*Attorney, Agent, or Firm*—Riches, McKenzie & Herbert

[57] ABSTRACT

This invention relates to a removable load supporting stand for temporary attachment to a tree trunk or the like for use while hunting for example. According to the invention a stand is provided including a platform extending laterally outwardly from the tree trunk. The platform has a load supporting portion between opposing sides. Engaging means on an inward portion of the platform function to releasably engage an adjacent segment of the tree trunk. A chain at each of it's ends is secured to an opposing side of the platform. The chain releasably encompasses the tree trunk upward of the segment and defines a plane transverse an axis of the tree trunk. The chain is flexible in the plane and resistant to flexure perpendicular to the plane. Biasing means engage the chain and urge the chain in a direction of the plane to disengage the tree trunk. Preferably the chain is comprised of two parallel spaced apart rows of overlapping links transversely interconnected by pins disposed substantially normal to the plane, such that the links and pins define a longitudinal series of apertures therebetween. The biasing means preferably comprise an elongate flexible member having an inherent tendency to assume a selected configuration when unstressed.

12 Claims, 4 Drawing Sheets

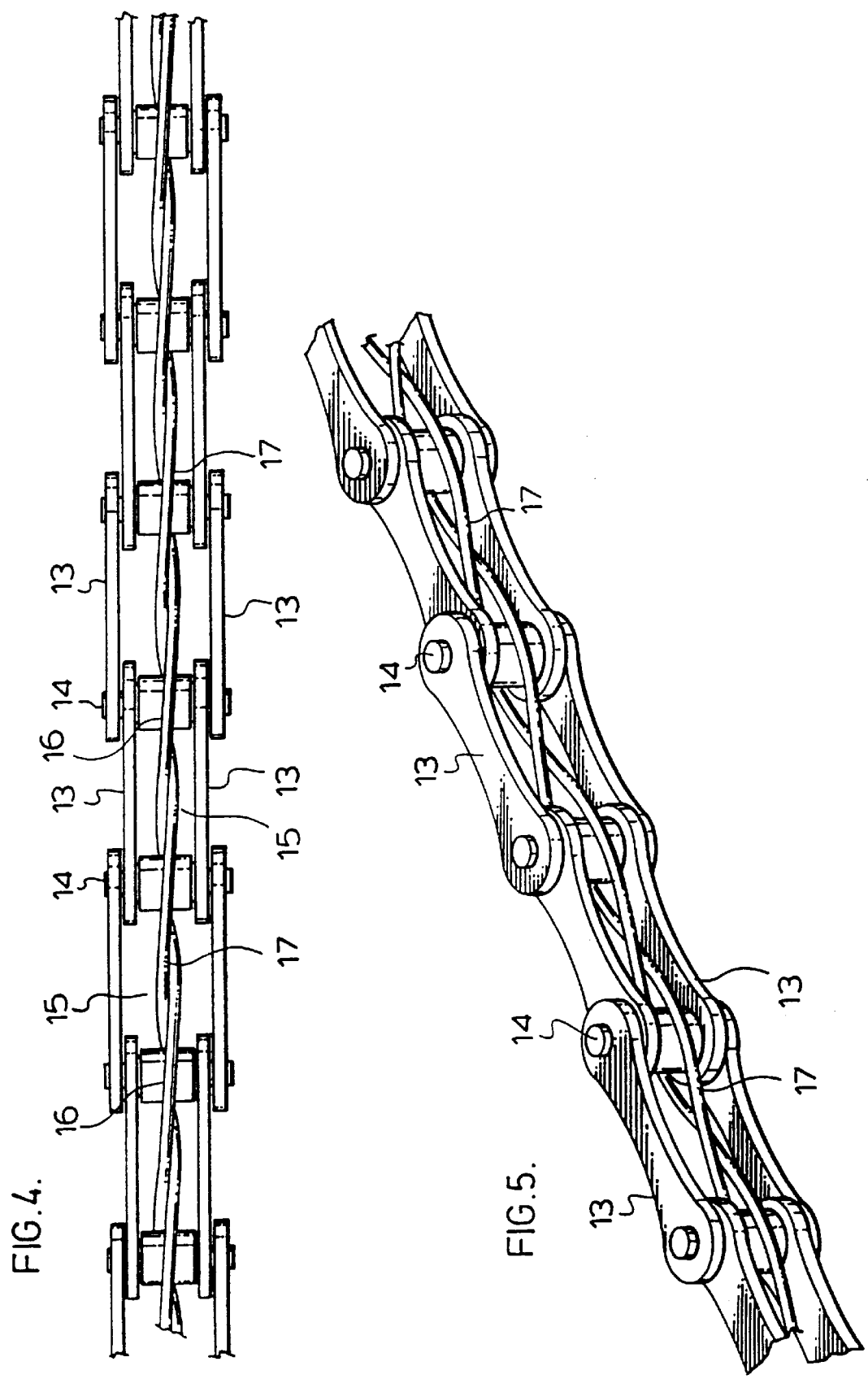

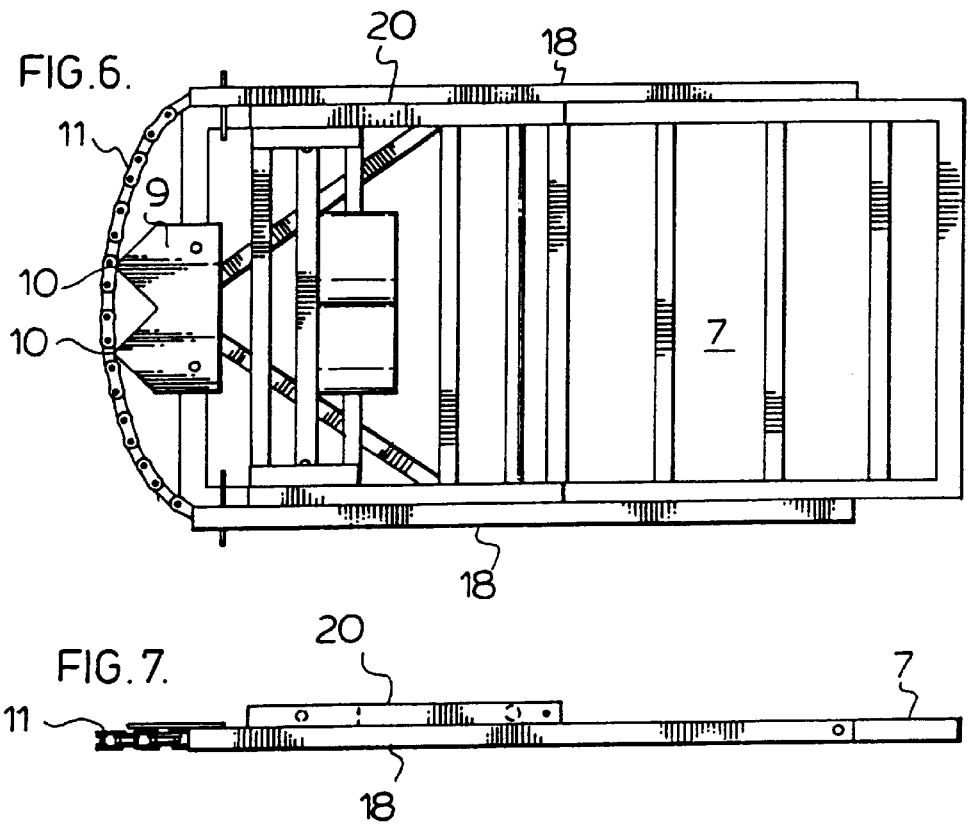
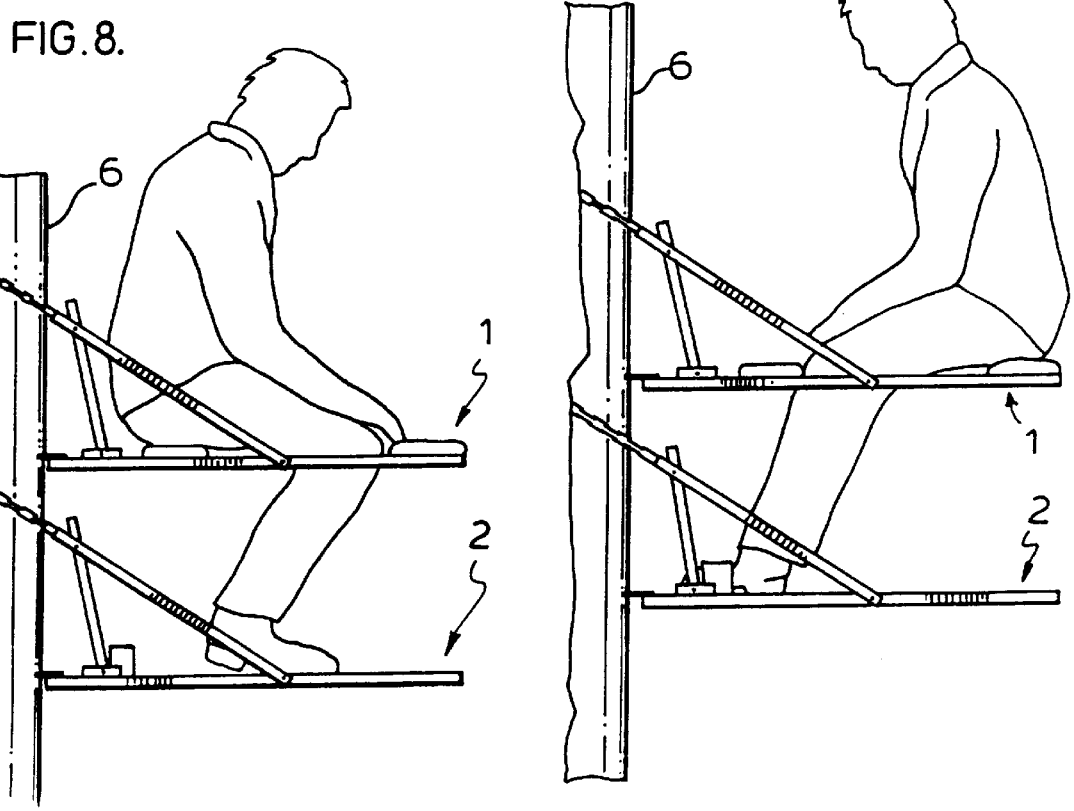

TREE STAND

RELATED APPLICATION

This application is a continuation of U.S. patent application Ser. No. 08/401,501, filed Mar. 10, 1995 U.S. Pat. No. 5,588,499, issued Dec. 31, 1996.

FIELD OF THE INVENTION

The invention relates to a removable stand for temporary attachment to a tree trunk or the like, for use while hunting, for example.

BACKGROUND OF THE INVENTION

Load supporting stands are commercially available for climbing and remaining perched at an elevation upon a tree trunk, utility pole or like structure. Of particularly wide spread use are lightweight portable stands used by hunters which include one or two tree grasping stands.

Such stands have a load supporting platform extending laterally outwardly from the tree trunk and a generally U-shaped member encircling the tree above the level of the platform. The weight of a person supported on a stand creates an eccentric load outward of and generally parallel to the axis of the tree. The eccentric loading is resisted by an equal and opposite force couple which forces the inward portion of the platform toward the tree and creates tensile forces in the U-shaped member forcing that member to grasp the tree. To increase resistance to downward sliding of the platform, engaging means such as a knife edge are conventionally provided on an inward portion of the platform, and such knife edges may also be provided on the inward portion of the U-shaped member.

Typically the stands are carried on a person's back like a knapsack. The stands may be foldable to a compact storage position, or an upper and lower stand may be nested together for ease of transport and storage.

A single stand may be positioned at an elevation by a person climbing the tree possibly with the assistance of commercially available portable ladders, climbing belts, etc. A preferred approach is to use an upper and lower stand which enables a person to climb the tree and provides a seat on the upper stand. Examples of such dual stands are described in the following U.S. patents: U.S. Pat. No. 3,960,240 to Cotton issued Jun. 1, 1976; U.S. Pat. No. 4,316,526 to Amacker issued Feb. 3, 1982; U.S. Pat. No. 4,331,216 to Amacker issued May 25, 1982; U.S. Pat. No. 4,417,645 to Untz issued Nov. 29, 1983; U.S. Pat. No. 4,452,338 to Untz issued Jun. 5, 1984; U.S. Pat. No. 4,726,447 to Gibson et al issued Feb. 23, 1984; U.S. Pat. No. 4,953,662 to Porter issued Sep. 4, 1990; and U.S. Pat. No. 4,969,538 to Amacker issued Nov. 13, 1990.

The lower stand conventionally has a generally rectangular load supporting platform, while the upper stand includes an interior opening within which the person stands at approximately waist height during climbing. The upper stand includes a seat and the lower stand often includes foot straps to secure one's feet to the lower stand to facilitate climbing.

The stands are positioned upon the tree trunk and a person stands upon the lower platform within the opening of the upper platform to commence climbing. The upper platform is tilted toward the tree and is lifted with the person's arms. The person then shifts their weight from the lower stand to the upper stand by sitting upon a seat of the upper stand. The lower stand, with all weight removed, is then tilted inwardly and raised by lifting the feet secured by the straps to the lower stand. The process is repeated until the desired elevation is attained and is reversed to the descend from the elevation.

The U-shaped member of conventional stands is commonly a rigid member bolted to brackets on opposing sides of the platform to encompass the tree. A series of bolt receiving holes or telescoping bracket arms enable adjustment to accommodate various tree trunk diameters, and to facilitate rapid installation and removal.

The telescoping bracket arms and associated tree engaging blades represent a significant proportion of the overall weight of the conventional stand. The rigid arms are difficult and awkward to engage with the tree in operation. A disadvantage of such stands is that the width of the platform effectively limits the maximum width of the tree trunk that can be grasped. Enlarging the platform width significantly would result in an undesirable increase in weight. Irregularly shaped tree trunks are not easily accommodated and if such an irregular trunk is not securely grasped by the stand, instability may result.

Since typically the diameter of a tree trunk reduces as one climbs upwardly, the position of the U-shaped member must often be adjusted to maintain the platform in a substantially level orientation. One may readily foresee the consternation of a heavily laiden hunter perched high in a tree, deep in the woods, who drops an essential wingnut, bolt or pin into the surrounding undergrowth. Clearly a high degree of safety and reliability in operation, ease of adjustment and simplicity of design are desirable in such devices.

A tree or pole may be damaged especially by a repeated use of such devices. To alleviate this problem, a stand has also been proposed which utilizes a flexible, flat steel band or strap to function as the U-shaped member encompassing the tree. Such a device is described in U.S. Pat. No. 4,488,620 to Gibson issued Dec. 18, 1984. Neoprene pads are also used on the inward portion of the platform by Gibson to reduce damage.

Damage to the tree is not completely eliminated using such a device since the sharp upper edge of the flexible steel band digs into the tree bark. This embedded edge may be difficult to disengage during climbing rough barked trees, and may penetrate the bark of smooth barked trees.

The steel strap must be flexible enough to allow it to encircle the tree, and to be adjustable in a manner similar to a belt. The steel strap of course must be as lightweight as possible to improve portability. Materials having such qualities would be spring steel or steel strapping, however such materials are prone to brittle fracture. The steel strap may be dented or bent during improper handling and use. Metal fatigue due to continual flexing could lead to sudden brittle fracture and failure of the flexible strap, especially in damaged areas of the strap or areas of stress concentration. Obviously, any fall while hunting in the woods may be significantly more serious than in populated areas. Use of mild steel for the strap would reduce the risk of brittle fracture. However, mild steel is not suitable since it is relatively heavy and is not sufficiently flexible to perform the function.

DISCLOSURE OF THE INVENTION

To address the difficulties and disadvantages associated with conventional stands as described above, the invention provides a removable stand having a novel structure, for temporary attachment to a tree trunk or the like.

According to the invention such a stand is provided including a platform extending laterally outwardly from the tree trunk. The platform has a load supporting portion between opposing sides. Engaging means on an inward portion of the platform function to releasably engage an adjacent segment of the tree trunk. A chain at each of it's ends is secured to an opposing side of the platform. The chain releasably encompasses the tree trunk upward of the segment and defines a plane transverse an axis of the tree trunk. The chain is flexible in the plane and resistant to flexure perpendicular to the plane. Biasing means engage the chain and urge the chain in a direction of the plane to disengage the tree trunk.

Preferably the chain is comprised of two parallel spaced apart rows of overlapping links transversely interconnected by pins disposed substantially normal to the plane, such that the links and pins define a longitudinal series of apertures therebetween. The biasing means comprise an elongate flexible member having an inherent tendency to assume a selected configuration when unstressed.

BRIEF DESCRIPTION OF THE DRAWINGS

In order that the invention may be readily understood, a preferred embodiment of the invention will be described by way of example with reference to the accompanying drawings in which:

FIG. 4 is a view of the chain and biasing means in the plane of the chain;

FIG. 5 is a view of the chain and biasing means at an angle to the plane;

FIG. 6 is a plan view of the lower stand in a folded storage position;

FIG. 7 is an elevation view of the folded lower stand; and

FIGS. 8 and 9 are elevation views of the device of FIG. 1 in use which stationery, and during raising and lowering respectively.

DETAILED DESCRIPTION OF PREFERRED EMBODIMENTS OF THE INVENTION

Figure 1:
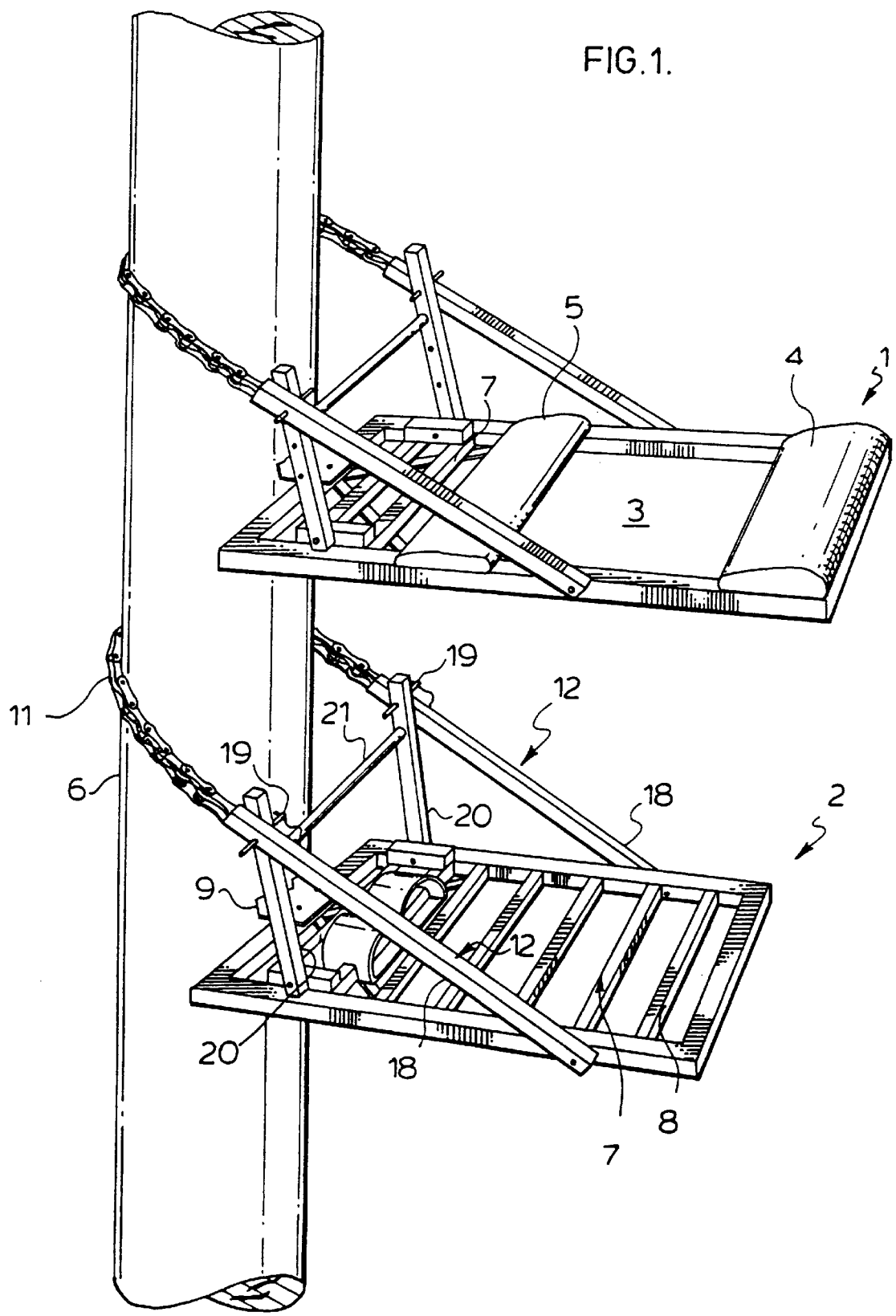
FIG. 1 is an upper inward isometric view of a device including an upper and lower stand, shown in an erect operative position attached to a tree trunk.

As illustrated in FIG. 1, the invention may by embodied in a device having an upper stand 1 and lower stand 2, or a single stand of the lower type 2 may be used alone depending upon the application and preference of the user. The upper stand 1 is identical in all material respects to the lower stand 2, except as is conventional, the upper stand includes an opening 3 in its platform to accommodate a user's torso and legs. Also included, as is conventional, is a first padded seat 4 for use during climbing and descent, and a second seat 5 for use while operational during hunting for example. Since both upper and lower stands 1 and 2 have very similar structures, for the sake of brevity, the following description and FIGS. 2 to 7 relate only to a stand of the lower type 2 although it will be understood that any description relates equally to both types of stands 1 and 2.

With reference to the lower stand 2 of FIG. 1, a removable stand 2 is provided for temporary attachment to a tree trunk 6 or the like. The stand 2 includes a platform 7 extending laterally outward from the tree trunk 6. The platform 7 as illustrated is constructed of an outer rectangular metal frame made of welded tubular members. Inward of the frame, the platform has a load supporting portion between opposing sides made of a series of transverse tubular members 8. The upper frame 1 is also illustrated as a welded rectangular frame of tubular members, the difference being the inclusion of an opening 3 and first and second padded seats 4 and 5 the use of which has been described above in respect of conventional stands.

Figure 2:
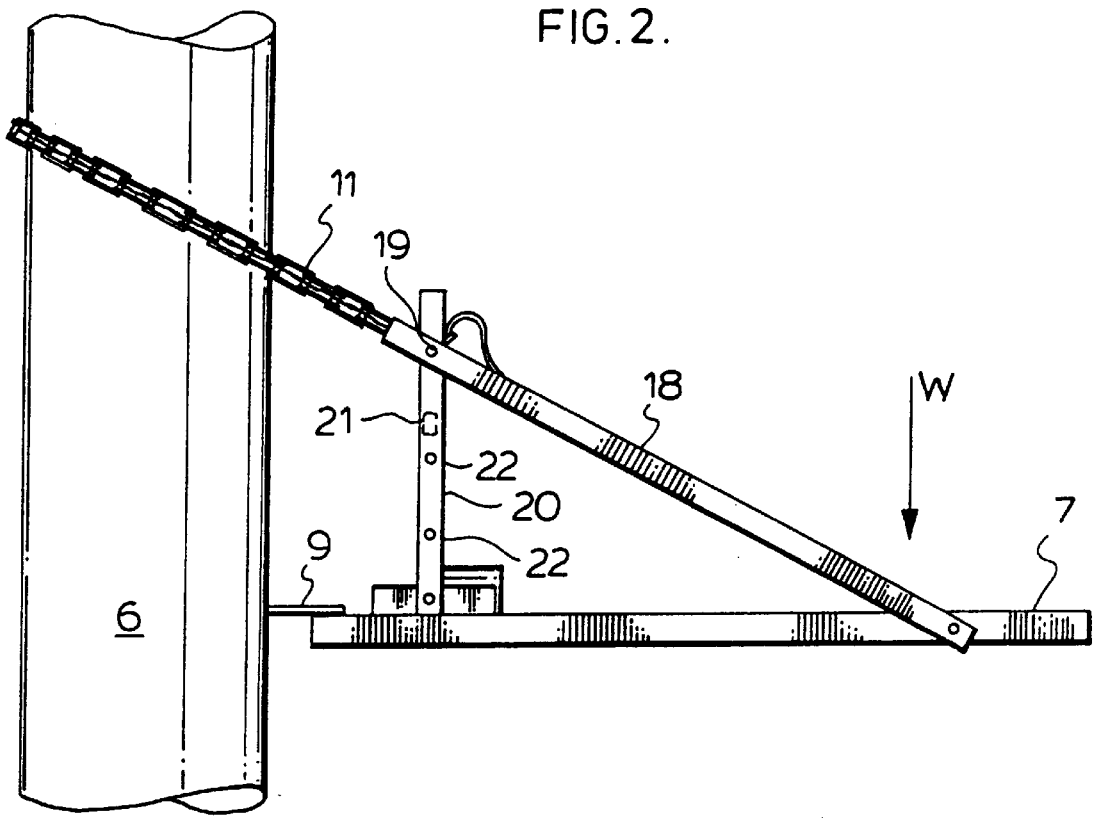
FIG. 2 is an elevation view of the lower stand.
Figure 3:
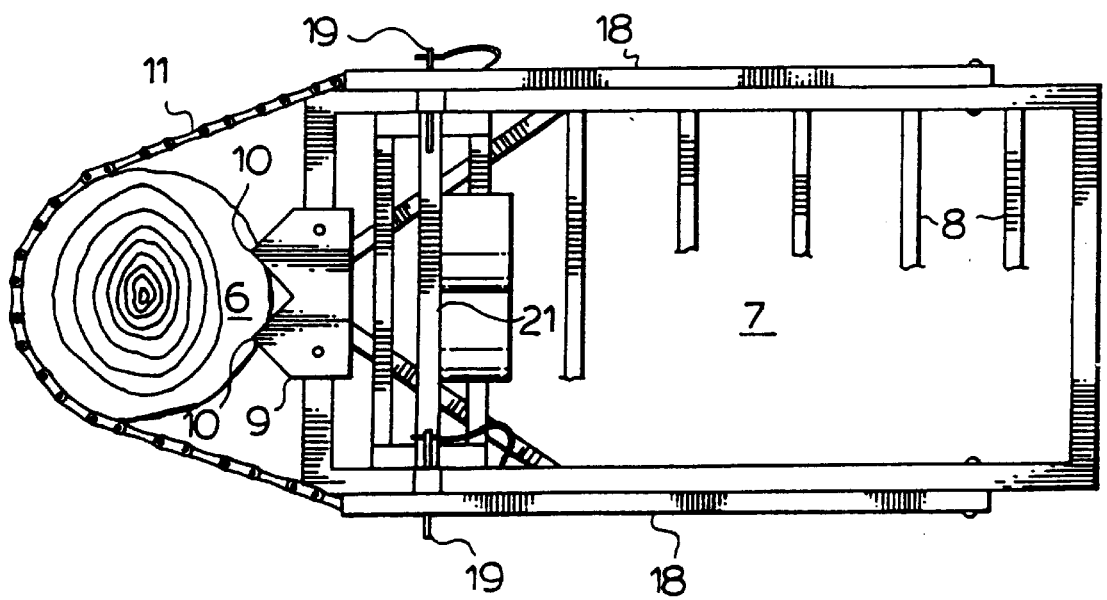
FIG. 3 is a plan view of the lower stand.

As best shown in FIGS. 2 and 3, on an inward portion of the platform 7, engaging means 9 are provided to engage an adjacent segment of the tree trunk 6. A knife plate 9 is bolted to the inward portion of the platform 7 to grip the tree 6 and prevent relative vertical movement between the tree trunk 6 and the platform 7. Where damage to the tree 6 is a concern or is prohibited by local regulations, other gripping or engaging means 9 such as neoprene pads may be used. The knife plate 9 illustrated has two inwardly projecting teeth 10 which securely grip the tree during operation.

A chain 11 releasably encompasses the tree trunk upward of the segment engaged by the knife plate 9. The weight of a person standing upon the platform 7, as represented by downward arrow W in FIG. 2, causes the knife plate 9 to be forced into engagement with the tree and creates tension in the chain 11. The coupling of these forces thereby secures the platform 7 to the tree 6 and prevents the platform 7 from sliding down the tree trunk 6.

The use of a chain 11 results in a weight reduction in comparison to conventional rigid arms as described above. In addition to advantages in transporting a stand, weight reduction reduces manufacturing costs and labor content.

In the embodiment illustrated, the stand 2 includes support brackets 12 on each opposed side of the platform thereby securing two ends of the chain 11, one to each of the opposing sides of the platform 7. The chain 11 therefore releasably encompasses the tree trunk 6 and defines a plane transverse to an axis of the tree trunk 6. The chain 11 is flexible in that plane, and is resistance to flexure perpendicular to the plane.

The above described properties of the chain 11 are especially advantageous when used in conjunction with an upper stand 1 for climbing. The use of such stands 1 and 2 in order to climb the tree trunk 6 is described above in detail in relation to conventional devices. When the person's weight is removed from the stand 2 (represented by downward arrow W in FIG. 2) the stand may be rotated upwardly inwardly to disengage the knife plate 9 and chain 11 from the tree. The stand 2 may be then lifted or lowered by sliding the stand relative to the tree trunk 6 as is conventional through use of one's feet secured by straps to the platform 7. Re-application of the person's weight to the platform 7 forces the knife plate 9 and chain 11 into secure engagement with the tree trunk 6. The chain 11 must be resistant to flexure perpendicular to the plane in order to properly disengage the tree and to be properly secured at a new position. For example, if a rope was used instead of a chain 11, such a rope would slacken and remain in engagement with the tree trunk 6 as one attempts to slide the stand upwardly or downwardly. Therefore, the chain 11 being relatively rigid perpendicular to the plane defined by its arc, remains in that plane as it is moved upwardly and downwardly. As a result, the chain 11 is able to re-engage the tree trunk 6 at a desired new position, without requiring the operator to handle the chain 11.

The chain 11 is flexible in the plane defined by its arc in order to accommodate any irregular shape of tree trunk, and to be fully adjustable to a wide range of tree trunk diameters. Since the chain 11 is flexible in the plane, under its own weight or as a result of becoming embedded in the tree bark, the chain 11 used alone may remain in engagement with the tree and impede movement of the stand 2. FIGS. 4 and 5 show details of a preferred embodiment of the chain 11 and accompanying biasing means. In order to urge the chain 11 a direction of the plane to disengage the tree trunk 6, biasing means are necessarily provided engaging the chain 11. As seen in FIGS. 4 and 5, the chain 11 and the biasing means, illustrated as elongate flexible members comprising strands of wire rope 16 and 17, form in combination an elongate strap member. As seen in FIGS. 1 and 2, end portions of this elongate strap member including both the chain 11 and the wire rope extend into the hollow interior of inclined tubular struts 18 on each side of the platform.

Preferably, the chain 11 is constructed of two parallel spaced apart rows of overlapping links 13. This type of chain 11 is commonly available as a motorcycle, bicycle, or industrial machinery chain and therefore is conveniently repaired or replaced with readily available materials. Transversely interconnecting the overlapping links 13 are hinged with pins 14 disposed substantially normal to the plane. Such chains conventionally used in motorcycles and bicycles, for example, have the ends of the pins 14 deformed to rivet the chain links 13 together. A roller may be positioned coaxially on the pin 14 to space apart the rows of links 13 and to reduce friction between such a chain 11 and any interconnecting parts. The links 13 and the pins 14 define a longitudinal series of apertures 15 in the chain 11. As illustrated, the apertures 15 are substantially rectangular however it will be understood that any suitable chain having the recited properties may be used.

In order to urge the chain 11 to disengage the tree trunk 6 in a direction of the plane defined by the arc of the chain, biasing means are provided. For simplicity of construction, preferably the biasing means take the form of an elongate flexible member which has the inherent tendency to assume a selected configuration when unstressed. An elongate flexible member can be easily engaged with an elongate chain 11 and interact with the chain 11 to disengage the tree as a result of the tendency of the flexible member to assume the selected configuration when unstressed, and the ability to flex with the chain 11 to conform to the irregular surface of the tree trunk 6.

The unstressed configuration of the flexible member may include any configuration which urges the chain 11 to disengage the tree trunk. Preferably, such a configuration is one having a radius of curvature in the plane greater than that of the tree trunk 6. Therefore, such a configuration results in formation of the chain 11 in an arc to disengage the chain 11 when the weight is removed from the stand and the stand is rotated upwardly to raise or lower the stand. For practical reasons, use of a flexible member having a straight selected configuration when unstressed is preferred, since such flexible members are easily commercially available in the form of, for example, plastic strips, coil springs, steel cables, wire rope or strips of spring steel.

As illustrated in FIGS. 4 and 5, the elongate flexible member may include a first strand of wire rope 16 alternatingly woven through the apertures 15. Wire rope 16 may be preformed to have an inherent tendency to assume a straight or curvate configuration when unstressed. Wire rope 16 is also readily available, relatively inexpensive, and is durable in such an application. To increase the effectiveness of the flexible member and its durability, the flexible member may include a second strand of wire rope 17 alternatingly woven through the apertures 15 opposite to and interwoven with the first strand 16.

When the chain is flexed to form an arc around the tree trunk 6, the inherent tendency of the wire rope 16 will urge the chain 11 to form an arc between the two ends of the chain 11 secured to opposing sides of the platform 7. When weight is released from the platform 7 and the platform 7 is rotated upwardly, the wire rope 16 forces disengagement of the tree 6 as a result of its inherent tendency to rebound to a selected configuration when unstressed. Preferably, the two ends of the flexible member, such as first and second strands of wire rope 16 and 17, are each secured to restrict relative movement between the ends of the flexible member and the chain 11. Repeated flexing of the chain and engaged flexible member may result in the flexible member working loose from the chain 11. For example, the wire rope 16 woven through the apertures 15 may move incrementally in a longitudinal direction each time the chain 11 and flexible member are flexed. Preferably therefore, the flexible members end are secured to restrict relative movement in order to maintain the engagement of the flexible member and the chain 11.

Referring to FIGS. 1, 2 and 3, in order to accommodate trees of varying widths and to release the stand from the tree, securing means are provided for adjustably connecting an end of the chain 11 to an associated opposed side of the platform. The embodiment illustrated has such securing means on both sides of the platform 7 and as a result may be easily operated by either right-handed or left-handed persons. The securing means illustrated also function to allow the brackets 12 to pivot between an erect operating position and a folded storage position as will be described in detail below. An upwardly, inwardly inclined hollow tubular strut 18 has a lower end connected to an outward portion of the associated platform side. The inward open end of the strut 18 receives the associated end of the chain 11. The hollow strut therefore provides the securing means with an elongate cavity in the plane to telescopically house the associated end of the chain 11.

A removable connecting rod 19 projects through mating bore adjacent to the inward of the strut 18 and through an aperture 15 of the chain 11 housed therein.

Housing of the chain 11 within the interior of the strut 18 performs two important functions. Firstly, the chain 11 is of adjustable length to accommodate various tree trunk diameters and to allow the platform 7 to be levelled. The resulting loose end of the chain 11 would present a safety hazard to the feet of a person standing on the platform 7. Housing of the chain 11 within the hollow strut 18 provides a clear standing surface on the platform 7 and avoids the possibility of entangling the chain 11 in one's leg or boot laces while standing on the platform 7. Secondly, the housing of the chain 11 within an elongate cavity in the plane of the chain 11 serves to support the chain 11 in the plane transverse to the axis of the tree trunk 6. The chain 11 is inherently resistant to flexure perpendicular to the plane, however by securing the chain 11 within a relatively rigid hollow tube, the end of the chain 11 is further secured to resist rotation perpendicular to the plane.

In addition to the strut 18, the support bracket 12 includes an upwardly extending post 20 having a lower end pivotally connected to an inward portion of an associated platform side. The associated end of the chain 11 is adjustably connected to an upper portion of the bracket by preferably housing the chain 11 within the hollow strut 18 as described above. The removable connecting rod 19 projects through mating bores in the upper ends of the hollow strut and associated post 20. The rod 19 also projects through an aperture of the chain 11 housed within the associated strut 18. As a result, the connecting rod 19 performs two functions. Firstly, the connecting rod 19 allows adjustment of the length of the chain 11. Secondly, the connecting rod 19 serves to releasably connect the upper ends of the associated posts 20 and struts 18 to allow rotation of the struts 18 and posts 20 between an erect operative position illustrated in FIGS. 1, 2 and 3 and a folded storage position illustrated in FIGS. 6 and 7.

In the folded position, the chain 11 is shortened to be protectively engaged on the teeth 10 of the knife plate 9. In the folded position therefore the stand is compact and easily carried. The engagement of the chain 11 upon the teeth 10 of the knife plate 9 is a safety feature which prevents contact with the relatively sharp teeth 10 and helps to prevent entanglement of the chain 11 as one carries the stand through dense bush.

As best shown in FIG. 3, the width of the tree trunk 6 may be larger or smaller than the width of the platform. When the width of the tree trunk 6 is less than the platform, tension upon the chain 11 results in a force component which tends to force the opposing struts 18 and posts 20 together. A horizontal brace 21 connects between the two upright posts 20 to resist forces which would tend to drive the opposing posts 20 and struts 18 together or apart. If the diameter of the tree trunk is greater than the width of the platform 7, tension in the chain would have a resultant force tending to drive the posts and struts apart thereby inducing tension in the horizontal brace 21. The horizontal brace 21 also facilitates erection and folding of the bracket since both posts may be moved in unison. The brace 21 may also function to secure a person's feet to the lower stand 2 dispensing with the need for foot straps, or may be fitted with a padded back rest (not shown) for use in association with the second padded seat 5 of the upper stand 1.

In order to level the stand when the tree trunk 6 is not vertical, a series of longitudinally spaced holes 22 are provided in the posts 20 to allow angular adjustment of the platform 7 and inclined strut 18.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

What I claim is:

1. A removable stand for temporary attachment to a tree trunk or the like comprising:

a platform adapted for extending laterally outwardly from the tree trunk, the platform having a load supporting portion between opposing sides;

an engaging member on a rearward portion of the platform adapted for releasably engaging an adjacent segment of the tree trunk;

an elongate strap member having a first end, a second end, a first portion at the first end and a second portion at the second end, the first end portion of the strap member removably secured to one first side of the platform, the second end portion of the strap member secured to the other, second side of the platform, the strap member adapted for releasably encompassing the tree trunk defining a plane transverse an axis of the tree trunk, the strap member comprising a combination of a chain and biasing means, the chain being flexible in said plane and resistant to flexure perpendicular to said plane, the biasing means extending along the entire length of the chain and having an inherent tendency to urge the chain to form an arc in the plane between the two end portions of the strap member secured to the respective first and second sides of the platform;

the platform having an elongate first strut member on the first side of the platform comprising a hollow tube;

the first end portion of the strap member, including both the chain and the biasing means extending therealong, being telescopically slidably received within the first strut member for removal and insertion and to adjust the length of the strap member to be secured within the first strut member wherein said biasing means comprises an elongated flexible member, and the chain comprises two parallel spaced apart rows of overlapping links transversely interconnected by pins disposed substantially normal to said plane with a longitudinal series of apertures through the chain between the pins.

2. A stand as claimed in claim 1 including a first securing mechanism carried by the first strut member for releasably securing the first end portion of the strap member within the first strut member.

3. A stand as claimed in claim 1 wherein:

the first strut member having a bore extending therethrough transverse to a longitudinal of the first strut member and a removable connecting rod projecting through the bore and through any one of the apertures of the chain in the first end portion housed in the first strut member aligned with the bore to secure the strap member in the first strut member, wherein with removal of the rod from the bore of the first strut member the first end portion is telescopically slidable within the first strut member for removal and insertion and to adjust the length of the strap member to be secured within the first strut member by alignment with the bore of any one of the apertures of the chain in the first end portion.

4. A stand as claimed in claim 1 wherein the platform having an elongate second strut member on the second side of the platform comprising a hollow tube;

the second end portion of the strap member, including both the chain and the biasing means extending therealong, being telescopically slidably received within the second strut member for removal and insertion and to adjust the length of the strap member to be secured within the second strut member.

5. A stand as claimed in claim 4 including a second securing mechanism carried by the second strut member for releasably securing the second end portion of the strap member within the second strut member.

6. A stand as claimed in claim 4 wherein each of the first and second strut members extend longitudinally in the plane.

7. A stand as claimed in claim 6 wherein each of the first and second strut member support the respective first and second end portion of the strap member received therein so as to resist flexure of the chain perpendicular to the plane.

8. A stand as claimed in claim 4 wherein each of the first and second strut members comprise a hollow rectangular tube.

9. A stand as claimed in claim 1 wherein the elongate flexible member urges the chain in a direction in said plane to disengage the tree trunk.

10. A removable stand for temporary attachment to a tree trunk or the like comprising:

a platform adapted for extending laterally outwardly from the tree trunk, the platform having a load supporting portion between opposing sides;

an engaging member on a rearward portion of the platform adapted for releasably engaging an adjacent segment of the tree trunk;

an elongate strap member having a first end, a second end, a first portion at the first end and a second portion at the second end, the first end portion of the strap member removably secured to one first side of the platform, the second end portion of the strap member secured to the other, second side of the platform, the strap member adapted for releasably encompassing the tree trunk defining a plane transverse an axis of the tree trunk, the strap member comprising a combination of a chain and an elongate flexible member, the chain being flexible in said plane and resistant to flexure perpendicular to said plane, the flexible member extending along the length of the chain and having an inherent tendency to urge the strap member to form an arc in the plane between the two end portions of the strap member secured to the respective first and second sides of the platform;

the platform having an elongate first strut member on the first side of the platform comprising a hollow tube;

the first end portion of the strap member, including both the chain and the flexible member extending therealong, being telescopically slidably received within the first strut member for removal and insertion and to adjust the length of the strap member to be secured within the first strut member, the chain comprising two parallel spaced apart rows of overlapping links transversely interconnected by pins disposed substantially normal to said plane and with a longitudinal series of apertures through the chain between the pins, the flexible member extending along the length of the chain engaging each link of the chain, and the flexible member urging the chain in a direction in said plane to disengage the tree trunk.

11. A removable stand for temporary attachment to a tree trunk or the like comprising:

a platform adapted for extending laterally outwardly from the tree trunk, the platform having a load supporting portion between opposing sides;

an engaging member on a rearward portion of the platform adapted for releasably engaging an adjacent segment of the tree trunk;

a chain having a first end portion removably secured to one first side of the platform and a second end portion secured to the other, second side of the platform, the chain adapted for releasably encompassing the tree trunk defining a plane transverse an axis of the tree trunk, the chain being flexible in said plane and resistant to flexure perpendicular to said plane, the chain comprising two parallel spaced apart rows of overlapping links transversely interconnected by pins disposed substantially normal to said plane, a longitudinal series of apertures through the chain between the pins;

an elongate flexible biasing member extending along the entire length of the chain and having an inherent tendency to urge the chain to form an arc in the plane between the two end portions of the chain secured to the respective first and second sides of the platform;

the platform having an elongate first strut member on the first side of the platform comprising a hollow tube;

the first end portion of the chain together with an associated end portion of the elongate flexible biasing member extending therealong being removably, telescopically, slidably received within the first strut member for securing therein, a first securing mechanism carried by the first strut member for releasably securing the first end portion of the chain within the first strut member and permitting adjustment of the length of chain to be secured within the first strut member.

12. A stand as claimed in claim 11 wherein:

the first strut member having a bore extending therethrough transverse to a longitudinal of the first strut member and the first securing mechanism comprising a removable connecting rod projecting through the bore and through any one of the apertures in the first end portion of the chain housed in the first strut member aligned with the bore to secure the chain in the first strut member, wherein with removal of the rod from the bore of the first strut member the first end portion of the chain is telescopically slidable within the first strut member for removal and insertion and to adjust the length of the chain to be secured within the first strut member, by alignment of any one of the apertures in the end portion of the chain with the bore.

* * * * *